(12) United States Patent
Bordes et al.

(10) Patent No.: US 9,654,793 B2
(45) Date of Patent: May 16, 2017

(54) VIDEO ENCODING/DECODING METHODS, CORRESPONDING COMPUTER PROGRAMS AND VIDEO ENCODING/DECODING DEVICES

(71) Applicant: THOMSON LICENSING, Issy de Moulineaux (FR)

(72) Inventors: Philippe Bordes, Laille (FR); Pierre Andrivon, Liffre (FR); Philippe Salmon, Saint Sulpice la Foret (FR); Patrick Lopez, Livre sur Changeon (FR); Franck Hiron, Chateaubourg (FR)

(73) Assignee: THOMSON LICENSING, Issy-les-Moulineaux (FR)

( * ) Notice: Subject to any disclaimer, the term of this patent is extended or adjusted under 35 U.S.C. 154(b) by 217 days.

(21) Appl. No.: 14/490,999

(22) Filed: Sep. 19, 2014

(65) Prior Publication Data

US 2015/0085934 A1    Mar. 26, 2015

(30) Foreign Application Priority Data

Sep. 26, 2013 (EP) .................................. 13306318

(51) Int. Cl.
*H04N 7/12* (2006.01)
*H04N 15/00* (2006.01)
(Continued)

(52) U.S. Cl.
CPC ............. *H04N 19/52* (2014.11); *H04N 19/70* (2014.11); *H04N 19/16* (2014.11)

(58) Field of Classification Search
CPC ......... H04N 19/52; H04N 19/70; H04N 19/16
See application file for complete search history.

(56) References Cited

U.S. PATENT DOCUMENTS 5,818,968 A * 10/1998 Yoshimoto ............. H04N 5/145
348/E5.066
6,973,126 B1    12/2005 Yoneyama et al.
(Continued)

FOREIGN PATENT DOCUMENTS

EP         0863674      9/1998
EP         2163098      8/2011
(Continued)

OTHER PUBLICATIONS

Agyo etal: "HEVC Software modifications for field based coding", 12. JCT-VC meeting; 103, MPEG Meeting; Jan. 14, 2013-Jan. 23, 2013; (Joint Collaborative Team on Video Coding of ISO/IEC JTC1/SC29/WG11 and ITU-T SG.16); Jan. 7, 2013, pp. 1-6.
(Continued)

*Primary Examiner* — Dave Czekaj
*Assistant Examiner* — Tsion B Owens
(74) *Attorney, Agent, or Firm* — Brian J. Dorini; Jeffrey M. Navon

(57) ABSTRACT

A method for encoding an interlaced video comprising a sequence of alternating TOP and BOT fields is disclosed. The method for encoding comprises:
producing a sequence of frames, each frame being determined from at least two consecutive fields, each field forming a rectangular region of the frame,
encoding each frame of the sequence to produce an encoded video of the sequence of frames.

24 Claims, 7 Drawing Sheets

(51) Int. Cl.
*H04N 19/52* (2014.01)
*H04N 19/70* (2014.01)
*H04N 19/16* (2014.01)

(56) References Cited

U.S. PATENT DOCUMENTS

| | | | |
|---|---|---|---|
| 8,090,017 B2 | 1/2012 | Ying et al. | |
| 8,462,265 B2* | 6/2013 | Lu | H04N 5/144 348/448 |
| 2006/0098739 A1* | 5/2006 | Linzer | H04N 19/172 375/240.16 |
| 2008/0019438 A1 | 1/2008 | Takahashi et al. | |
| 2011/0058612 A1 | 3/2011 | Yoshikawa | |
| 2014/0079116 A1* | 3/2014 | Wang | H04N 19/597 375/240.02 |
| 2014/0092962 A1* | 4/2014 | Auyeung | H04N 19/00575 375/240.12 |

FOREIGN PATENT DOCUMENTS

| | | |
|---|---|---|
| JP | 11027662 | 1/1999 |
| WO | WO0057639 | 9/2000 |
| WO | WO2008148708 | 12/2008 |

OTHER PUBLICATIONS

Flynn etal: "HEVC Range Extensions Draft 1—based on High Efficiency Video Coding (HEVC) text specification draft 9", Joint Collaborative Team on Video Coding; Oct. 1, 2012;pp. 1-318.

Koyama etal: "Modification of derivation process of motion vector information for interlace format", 7. JCT-VC Meeting; 98, MPEG Meeting; Nov. 21, 2011-Nov. 30, 2011; Nov. 8, 2011, pp. 1-7.

Thiesse etal: "HEVC interlaced coding assessment and Chroma issue consideration", Motion Picture Expert Group or ISO/IEC JTC1/SC29/WG11, No. m26545, Oct. 14, 2012, pp. 1-9.

Search Report Dated Feb. 25, 2014.

Li et al., "An adaptive macro-block group coding algorithm for progressive and interlaced video", 2004 IEEE International Symposium on Circuits and Systems, Vancouver, British Columbia, Canada, May 23, 2004, pp. 969-972.

ITU-T H.264, "Advanced video coding for generic audiovisual services", ITU-T Rec H264/ISO/IEC 14496-10 AVC (MPEG4) or JVT H.264, Jan. 2012, pp. 1-680.

Bross et al., "High efficiency video coding HEVC text specification draft 7", Joint Collaborative Team on Video Coding (JCT-VC) of ITU-T SG16 WP3 and ISO/IEC JTC1/SC29/WG11, 9th Meeting: Geneva, Switzerland, Apr. 27, 2012, pp. 1-297.

Cheung, A., "GOP structures for interlaced video", Joint Collaborative Team on Video Coding (JCT-VC) of ITU-T SG 16 WP 3 and ISO/IEC JTC 1/SC 29/WG 11, 11th Meeting, Shanghai, China, Oct. 10, 2012, pp. 1-8.

International Standard ISO/IEC 13818-2, Information Technology—Generic Coding of Moving Pictures and Associated Audio Information: Video, 1st Edition, May 15, 1996, pp. 1-212.

Poynton: "Digital Video and HDTV Algorithms and Interfaces", p. 478, book edited by Morgan Kaufmann.

\* cited by examiner

US 9,654,793 B2

VIDEO ENCODING/DECODING METHODS, CORRESPONDING COMPUTER PROGRAMS AND VIDEO ENCODING/DECODING DEVICES

This application claims the benefit, under 35 U.S.C. §119 of European Patent Application No. 13306318.0, filed Sep. 26, 2013.

FIELD

The invention relates to video encoding and video decoding, in particular for interlaced video, using progressive video encoding/decoding tools.

An interlaced video comprises a sequence of alternating TOP and BOT fields. Each TOP field comprises lines intended to be displayed as odd lines and each BOT field comprising lines intended to be displayed as even lines. Each field of the sequence is intended to be displayed after the previous one, so that the odd lines and the even lines are alternatively updated on the display device.

On the contrary, a progressive video comprises a sequence of frames, each frame being intended to be displayed in place of the previous one.

A frame or a field is an array of pixels, each comprising one or several components. For color video, each pixel usually comprises a luma component and two chroma components. Generally, the same chroma component is used for several pixels, for example in the 4:2:0 or 4:2:2 formats.

BACKGROUND

The MPEG-4 part 10 standard, also referred to as H.264 standard or AVC standard, describes a method for encoding a progressive video comprising a sequence of frames intended to be displayed one after the other.

The MPEG-4 part 10 standard further describes a first mode for encoding an interlaced video. This first mode is called MBAFF mode. In this mode, each pair of macroblocks are encoded with the two fields either interlaced in the two macroblocks, or separated between the two macroblocks. The choice is made for each pair of macroblocks.

The MPEG-4 part 10 standard further describes a second mode for encoding an interlaced video. This second mode is called PAFF mode. In this mode, two consecutive fields are encoded either as two separate frames or interlaced in a single frame.

For both MBAFF and PAFF modes, both interlaced and progressive coding/decoding tools are needed, which increases the complexity and the cost of the encoder and the decoder.

In a variant known as "field coding", the fields are separated before coding and are encoded with progressive only tools. This solution is of lower complexity but requires an adaptation of a GOP structure which indicates in particular the order according to which the frames must be encoded. Specifically, a GOP structure intended for progressive video needs to be modified in a GOP structure intended for interlaced video. This is explained for instance in the paper "GOP structures for Interlaced Video" by C. Auyeung, JCTVC-K0153, 11th JCTVC meeting in Shanghai, Oct. 10-19, 2012.

There is therefore a need for new encoding/decoding tools that overcome at least in part the previous drawbacks.

SUMMARY OF THE INVENTION

It is proposed a method for encoding an interlaced video comprising a sequence of alternating TOP and BOT fields, characterized by:

producing a sequence of frames, each frame being determined from at least two consecutive fields, each field forming a rectangular region of the frame, encoding each frame of the sequence to produce an encoded video of the sequence of frames.

Optionally, encoding each frame of the sequence comprises, for at least one part of the frame:

determining a prediction part from pixels of a reference frame, determining a representation of a motion vector corresponding to the distance in pixels between the position of the part in the frame and the position of the prediction part in the reference frame, subtracting a pixel offset greater than two pixels from the absolute value of at least one component of the motion vector representation, determining prediction data comprising the subtraction value, the encoded video comprising the prediction data.

Optionally, the subtraction is carried out if the pixels from which the prediction part is determined belong to a field, called prediction field, different from the field of the part.

Optionally, the motion vector representation is a motion vector difference between a motion vector predictor and the motion vector.

Optionally, the additional pixel offset for the vertical, respectively horizontal, component is equal to the vertical, respectively horizontal, distance between the center of the prediction field and the center of the field of the part.

Optionally, each frame is produced from two consecutive fields by putting together the two fields one on top of the other and aligned vertically, and the pixel offset for the vertical component of the motion vector difference is equal to the height of one of the two fields.

It is further proposed a computer program comprising instructions which, when executed by a computer system, make the computer system carry out a video encoding method according to the invention.

It is further proposed a video encoding device for encoding an interlaced comprising a sequence of alternating TOP and BOT fields, characterized by:

a field combining unit configured to produce a sequence of frames, each frame being determined from at least two consecutive fields, each forming a rectangular region of the frame, a frame encoder intended to encode each frame of the sequence to produce an encoded video of the sequence of frames.

It is further proposed a method for decoding an encoded video of a sequence of frames, characterized by:

decoding each frame of the sequence, producing an interlaced video from the sequence of frames by extracting at least two rectangular regions of each frame, and defining the extracted rectangular regions as consecutive fields of the interlaced video.

Optionally, decoding each frame of the sequence comprises, for at least one part of at least one frame:

determining a motion vector representation from the encoded video, which comprises determining the absolute value of at least one component of the motion vector representation by adding a pixel offset greater than two pixels to a value determined from the encoded video, determining a motion vector from the motion vector representation, determining a prediction part from pixels of a reference frame, the pixels being determined from the motion vector.

Optionally, producing the interlaced video comprises horizontally dividing the frame into a top part defined as a first field and a bottom part defined as a second field.

Optionally, for the vertical component, the pixel offset is equal to two plus an additional pixel offset, the additional pixel offset being equal to the height of one of the two fields.

It is further proposed a computer program comprising instructions which, when executed by a computer system, make the computer system carry out a video encoding method according to the invention.

It is further proposed a video decoding device comprising:
a frame decoder configured to decode each frame of a sequence of frames,
a frame dividing unit configured to produce an interlaced video from the sequence of frames by extracting at least two rectangular regions of each frame, and defining the extracted rectangular regions as consecutive fields of the interlaced video.

BRIEF DESCRIPTION OF THE DRAWING

An embodiment of the invention will now be described by way of example only and with reference to the appended figures.

DETAILED DESCRIPTION OF THE DRAWING

Figure 1:
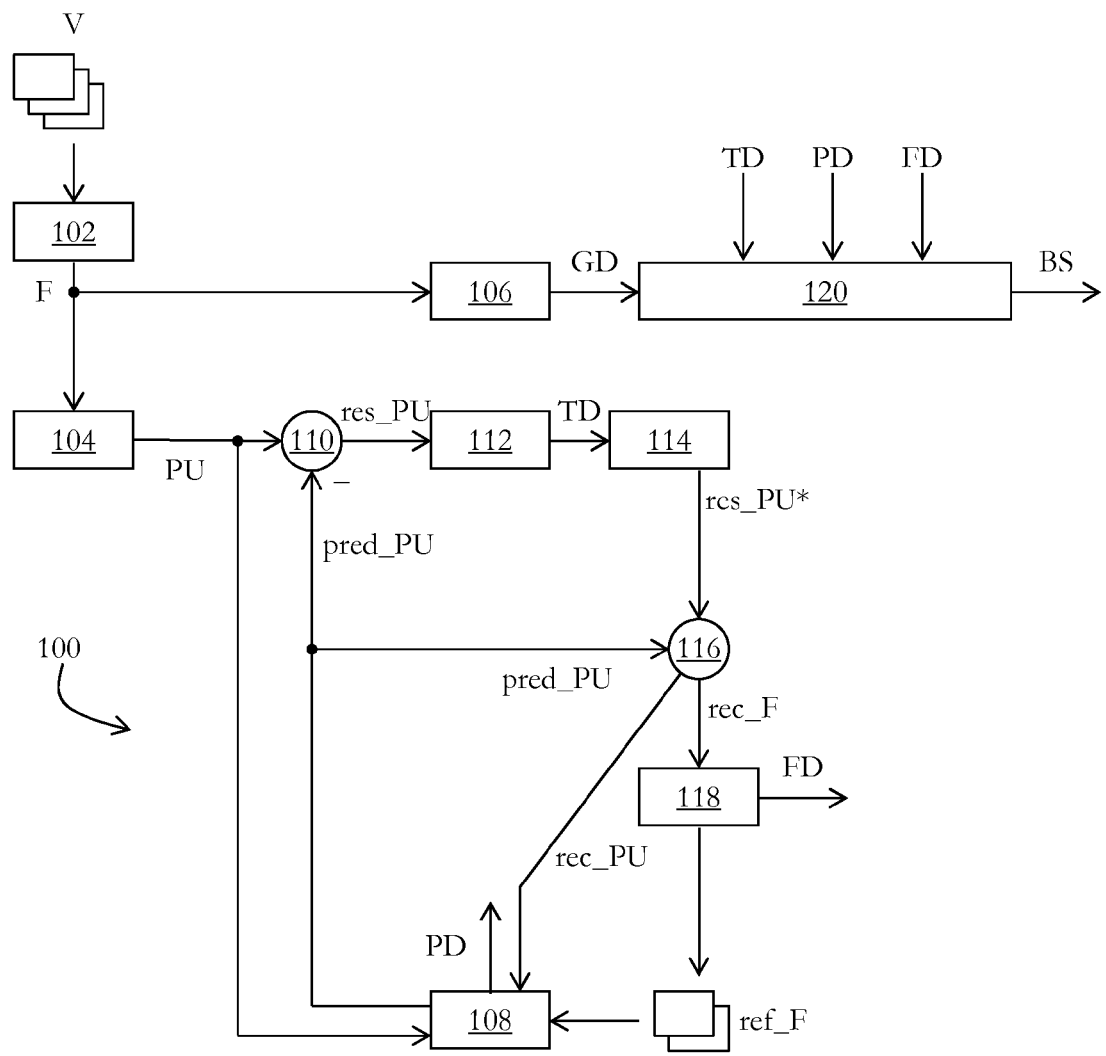
FIG. 1 illustrates a video encoding device according to the invention.

With reference to FIG. 1, a video encoding device 100 will now be described.

The video encoding device 100 comprises a field combining unit 102 intended to produce a sequence of frames F from an interlaced video V.

The video encoding device 100 further comprises a frame partitioning unit 104 intended to partition each frame F into parts. In the described example where the HEVC standard is used, the parts are called prediction units PUs. More precisely, the frame F is partitioned into coding tree units CTUs, each of which being partitioned into one or several coding units CUs, each of which being partitioned into one or several prediction units PUs. Hereinafter, the parts will carry the reference "PU" in accordance with the described example. Each part PU is preferably a rectangular region of the frame F, for example a square region.

The video encoding device 100 further comprises a general control unit 106 intended to produce general data GD regarding the video encoding.

The video coding device 100 further comprises a prediction unit 108 intended to predict each part PU in order to determine a prediction part pred_PU and to produce prediction data PD. The prediction is either an inter-prediction or an intra-prediction. In case of an inter-prediction, the prediction is carried out from a reference frame ref_F. This means that the prediction part pred_PU is determined from pixels of the reference frame ref_F. For instance, the prediction part pred_PU can be a part PU of the reference frame ref_F. As an alternative, the prediction part pred_PU can be interpolated from one or several parts PUs of the reference frame ref_F.

The video coding device 100 further comprises a comparison unit 110 intended to compare each part PU with the corresponding prediction part pred_PU in order to produce a residual part res_PU.

The video coding device 100 further comprises a transform unit 112 intended to calculate transform coefficients and to quantize these transform coefficients for the residual parts res_PUs in order to produce transform data TD representing these quantized coefficients.

The video coding device 100 further comprises an inverse transform unit 114 intended to produce approximated residual parts res_PUs* from the quantized coefficients.

The video coding device 100 further comprises a reconstruction unit 116 intended to combine each prediction part pred_PU with the corresponding approximated residual part res_PU* in order to produce a reconstructed part rec_PU. Furthermore, when reconstructed parts rec_PUs have been determined for a whole frame F, the reconstructed parts rec_PUs are put together in order to produce this frame, called reconstructed frame rec_F.

The video coding device 100 optionally further comprises at least one filter unit 118 intended to filter the reconstructed frame rec_F in order to produce filter data FD representing the applied filter(s), and to produce a filtered frame which can be buffered so as to become a reference frame ref_F that can be used for inter-prediction of subsequent frames F. When no filter is applied on the reconstructed frame rec_F, the reconstructed frame rec_F can instead be buffered so as to become a reference frame ref_F that can be used for inter-encoding subsequent frames F.

The video coding device 100 further comprises an entropy coding unit 120 intended to produce an encoded video of the sequence of frames, in the form of a bitstream BS, from the transform data TD, the prediction data PD, the general data GD and optionally the filter data FD.

The units 104 to 120 form a frame encoder.

Figure 2:
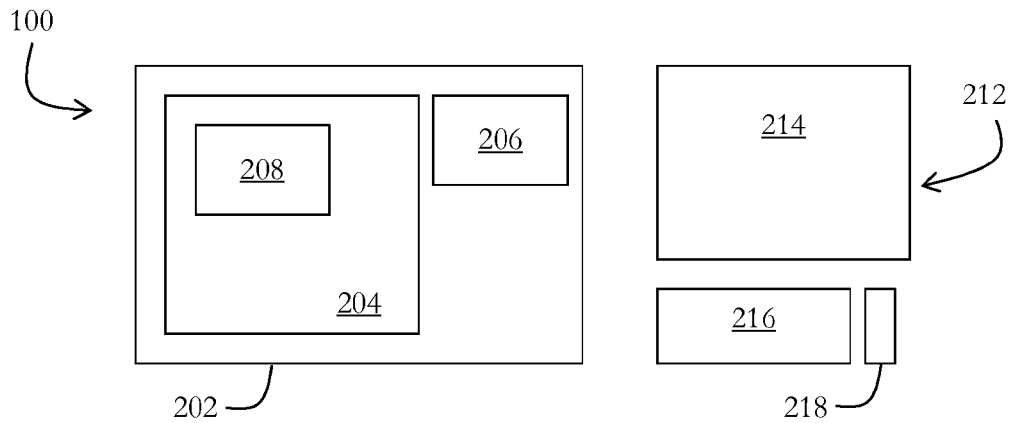
FIG. 2 illustrates a specific implementation of the video encoding device of FIG. 1.

With reference to FIG. 2, a specific implementation of the video encoding device 100 will now be described.

In this specific implementation, the video encoding device 100 is a computer system comprising a computer case 202 enclosing a memory 204 and a processing unit 206.

The video encoding device 100 further comprises a video encoding program 208 stored in the memory 204. The video encoding program 208 comprises instructions intended to be executed by the processing unit 206 so as to carry out a video encoding method which will be described in greater detail with reference to FIG. 3.

The video encoding system 100 further comprises a human computer interface 212 including for example a display 214 and input devices such as a keyboard 216 and a pointing device 218.

Figure 3:
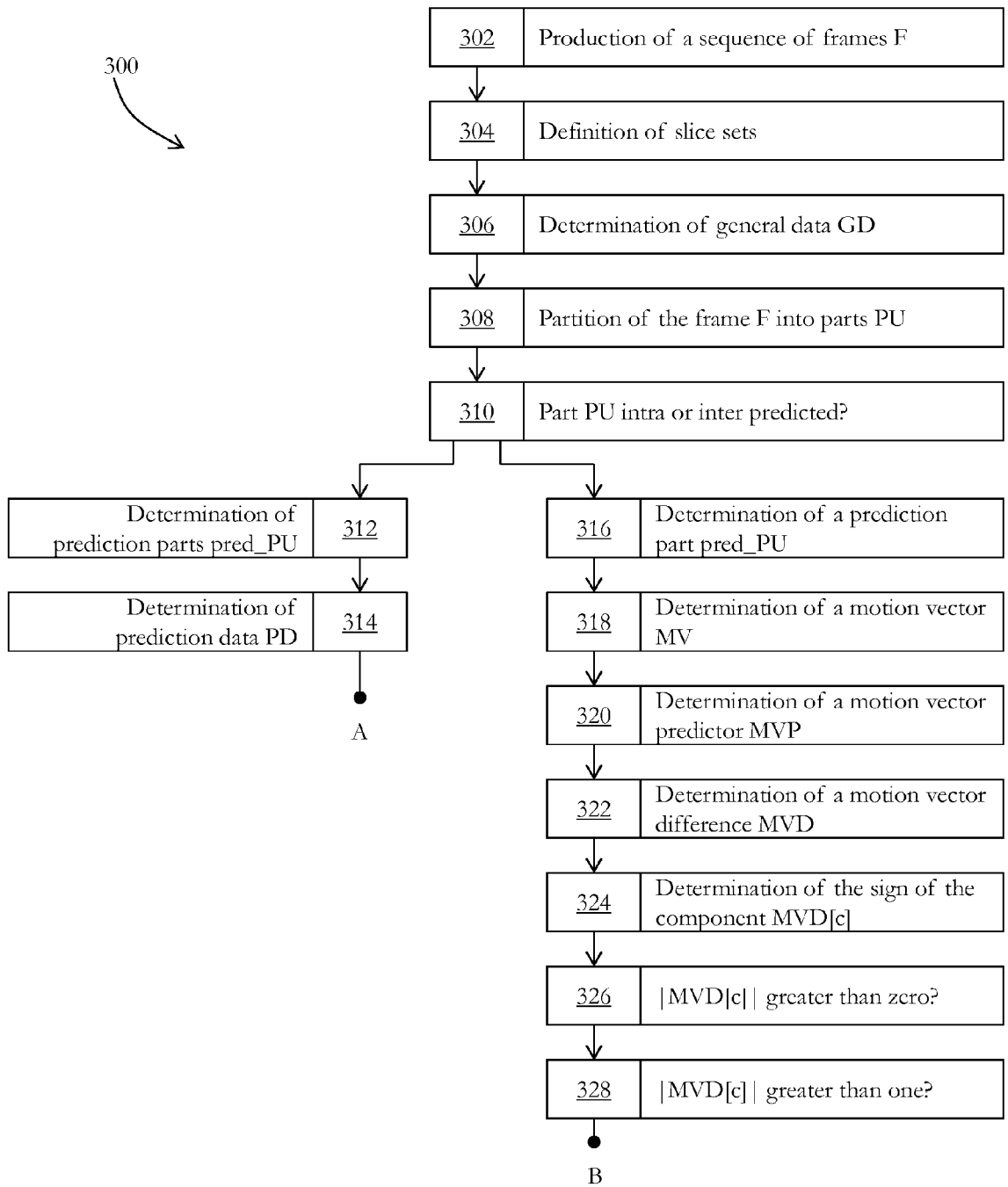
FIG. 3 illustrates a video encoding method intended to be carried out by the video encoding device of FIG. 1.
Figure 3:
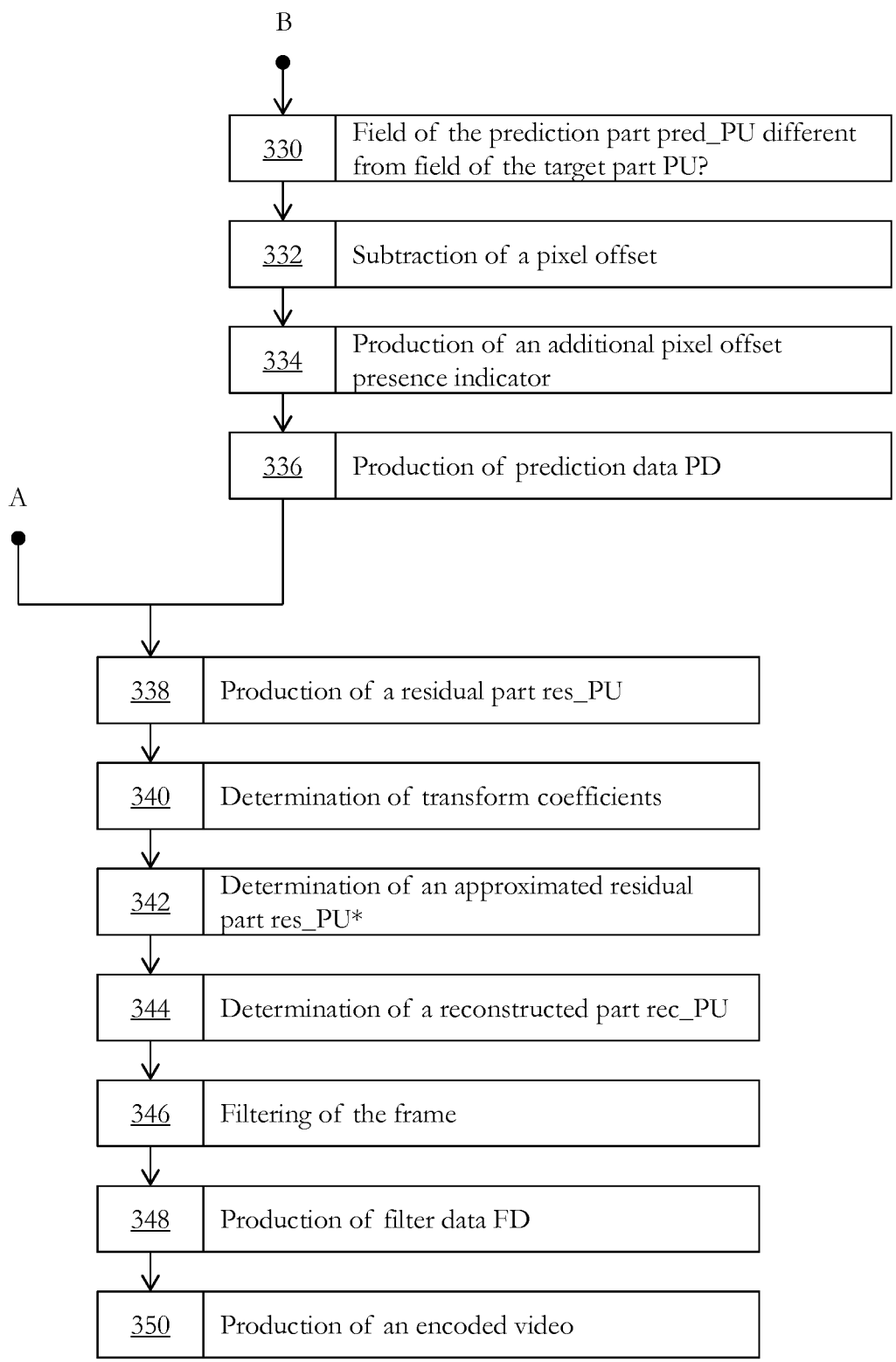

With reference to FIG. 3, a video encoding method 300 of an interlaced video V carried out by the video encoding device 100 described in FIG. 1 or 2 will now be described.

Figure 4:
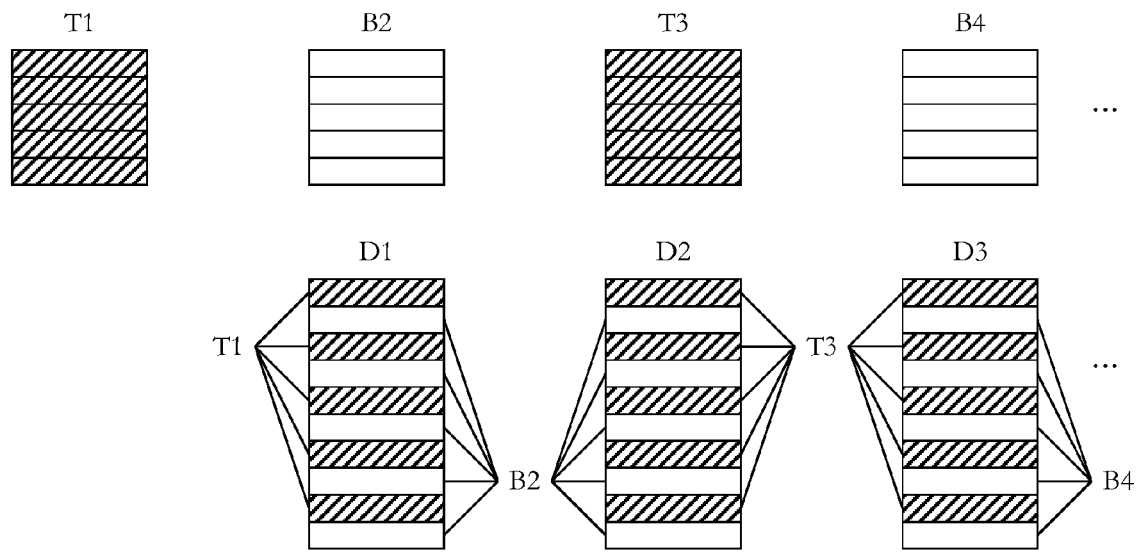
FIG. 4 illustrates an interlaced video and how it is intended to be displayed.

With reference to FIG. 4, the interlaced video V comprises a sequence of alternating TOP and BOT fields referred to as T1, B2, T3, B4, etc. In the described example, the TOP and BOT fields have the same height, i.e. the same number of lines of pixels. It should be noted that the lines of each field are grouped together, but are intended to be interlaced with the lines of the other field for display. Each field of the sequence is intended to be displayed after the previous one, so that the odd lines and the even lines are alternatively updated on the display device. For instance, at a time t1, the TOP field T1 is displayed as odd lines and the BOT field B2 is displayed as even lines. This results in a first image D1. At a later time t2, the TOP field T3 is displayed as odd lines while the BOT field B2 stays in place. This results in a second image D2. At a later time t3, the BOT field B4 is displayed as even lines while the TOP field T3 stays in place. This results in a third image D3. The interlaced video V is for example stored in the memory 204.

Back to FIG. 3, at a step 302, the field combining unit 102 produces a sequence of frames F, each frame F being determined from at least two consecutive fields, each forming a rectangular region of the frame so that the lines of the field constitute the lines of the rectangular region. It results that the rectangular region has the same size than the field. In the described example, each field is present in one frame only, so that the first frame is produced from the first at least two consecutive fields, and each subsequent frame is produced from the fields following—in the sequence of fields—the fields having produced the previous frame.

Figure 5:
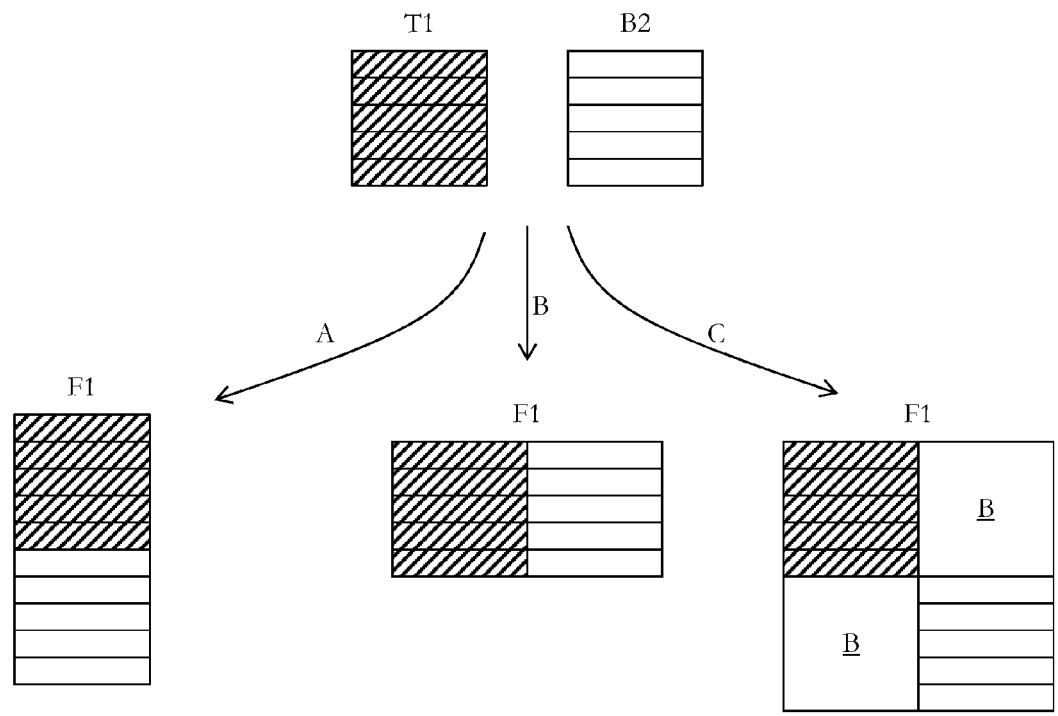
FIG. 5 illustrates a field combining step of the video encoding method of FIG. 3.

With reference to FIG. 5, three embodiments, referred to as A, B and C, of the previous step 302 carried out on a TOP field T1 and the consecutive BOT field B2 will now be described.

In embodiment A, a frame F1 is produced from the two consecutive fields T1, B2 by putting together the two fields one on top of the other and aligned vertically, for instance, the TOP field T1 is on top of the BOT field B2.

In embodiment B, a frame F1 is produced from the two consecutive fields T1, B2 by putting together the two fields one next to the other and aligned horizontally.

In embodiment C, the two fields are tiled with two blank parts B. The first field T1 is located at the top left corner of the frame F1, while the second field B2 is located at the bottom right corner of the frame F1.

In the described example, embodiment A is carried out.

Back to FIG. 3, in the described example where the HEVC standard is used, the video encoding method 300 further comprises a step 304, during which the general control unit 106 defines each field as a different slice set, i.e. each rectangular region formed by a field is defined as a slice set. A slice set is a collection of one or several slices that can share some high level data (e.g. VPS (Video Parameter Set), SPS (Sequence Parameter Set), PPS (Picture Parameter Set) and slice segment headers). Preferably, each slice set comprises only one slice, so that each field is defined as one slice. A slice is defined in the HEVC standard as a data structure that can be decoded independently from other slices of the same frame, in terms of entropy coding, signal prediction and residual signal reconstruction. However, filtering (which will be described in greater detail hereafter) is realized on the whole frame, irrespective of the slices.

At a step 306, the general control unit 106 produces general data GD. The general data GD comprises in particular the field composition of each frame, i.e. an indication of where the fields are located inside the frames. The general data GD further comprise an horizontal additional pixel offset and/or a vertical additional pixel offset. These pixel offsets will be described in greater detail hereafter. For example, these pixel offsets are stored in two variables: mvd_offset[0] for the horizontal pixel offset, and mvd_offset[1] for the vertical pixel offset. In the described example, as it will be explained hereafter, there is no horizontal pixel offset, so that the general data GD only comprise the variable mvd_offset[1] for the vertical additional pixel offset. In the described example where the HEVC standard is used, the field composition of each frame is indicated in the pic_struct indicator of the picture timing SEI message. The pic_struct indicator can take several predefined values that are indicated in the following table:

| Value | Indicated display of picture | Restrictions | Num-ClockTS |
|---|---|---|---|
| 0 | (progressive) frame | field_pic_flag shall be 0 | 1 |
| 1 | bottom field | field_pic_flag shall be 1 | 1 |
| 2 | top field | field_pic_flag shall be 1 | 1 |
| 3 | top field bottom field, in that order | field_pic_flag shall be 0 | 2 |
| 4 | bottom field, top field, in that order | field_pic_flag shall be 0 | 2 |
| 5 | top field, bottom field, top field repeated, in that order | field_pic_flag shall be 0 | 3 |
| 6 | bottom field, top field, bottom field repeated, in that order | field_pic_flag shall be 0 | 3 |
| 7 | frame doubling | field_pic_flag shall be 0 | 2 |
| 8 | frame tripling | field_pic_flag shall be 0 | 3 |
| 13 | All the top-fields in slice set 0, bot-fields in slice set 1 | field_pic_flag shall be 0 | 2 |
| 14 | All the top-fields in slice set 1, bot-fields in slice set 0 | field_pic_flag shall be 0 | 2 |

In the described example, the general control unit 106 produces a pic_struct indicator with the value of 13.

For each frame F of the sequence, called target frame F, the following steps 308 to 348 are carried out.

At a step 308, the frame partitioning unit 104 partitions the target frame F into parts PU.

At a step 310, the prediction unit 108 determines, for each part PU of the target frame F, whether it must be intra-predicted or inter-predicted. In the described example where the HEVC standard is used, the decision between intra-prediction and inter-prediction is realized at the coding unit CU level.

If a part PU must be intra-predicted, the following steps 312 and 314 are carried out.

At a step 312, for each part PU, called target part, the prediction unit 108 determines, from one or several already encoded and reconstructed parts rec_PUs, a prediction part pred_PU resembling the target part PU. In the described example, the intra-encoding is carried out within each field. This means in particular that the reconstructed part(s) rec_PU(s) used for determining the prediction part pred_PU, is/are looked for inside the field where the target part PU is located, and in the close neighborhood of the target part PU. As an example, a reconstructed part rec_PU resembles the target part if a SAD (English acronym of "Sum of Absolute Differences") is below a threshold value. Each absolute difference is computed between a pixel value in the target part PU and the corresponding pixel value in the reconstructed part rec_PU. Other metrics than SAD can be used.

At a step 314, the prediction unit 108 determines prediction data PD from the determination of the prediction parts pred_PUs. The prediction data PD indicates in particular which reconstructed part(s) rec_PU(s) is/are used, all or in part, to determine the prediction part pred_PU, and how the whole or portion of the reconstructed part(s) rec_PU(s) is/are used to determine the prediction part pred_PU.

If the part PU of the frame F must be inter-predicted, the following steps 316 to 336 are carried out.

At a step 316, the prediction unit 108 determines a prediction part pred_PU from pixels of a reference frame ref_F, i.e. a frame already encoded, reconstructed and buffered. The prediction part pred_PU can be any part PU of a reference frame ref_F having the same size than the target part PU and resembling the target part PU, or an interpolation determined from one or several parts PU of one or several reference frames ref_F and resembling the target part PU.

At a step 318, the prediction unit 108 determines a motion vector MV between the prediction part pred_PU and the target part PU, corresponding to the distance in pixels between the position of the target part PU in the target frame F and the position of the prediction part pred_PU in the reference frame ref_F.

At a step 320, the prediction unit 108 determines a motion vector predictor MVP for the target part PU. The motion vector predictor MVP is for example derived from the motion vectors MVs used for encoding neighboring already encoded parts PU.

At a step 322, the prediction unit 108 determines a motion vector difference MVD which is the difference between the motion vector MV and the motion vector predictor MVP. The motion vector difference MVD is a representation of the motion vector MV. "Representation" means that the motion vector difference MVD allows a decoding device to derive the motion vector MV from this representation. The motion vector difference MVD has the advantage of being usually smaller than the motion vector MV and therefore needs less bits to be encoded. The motion vector difference MVD comprises an horizontal component MVD[0] and a vertical component MVD[1]. In the following, these two components will be referred to as MVD[c], where c is equal to 0 for the horizontal component and 1 for the vertical component.

Figure 6:
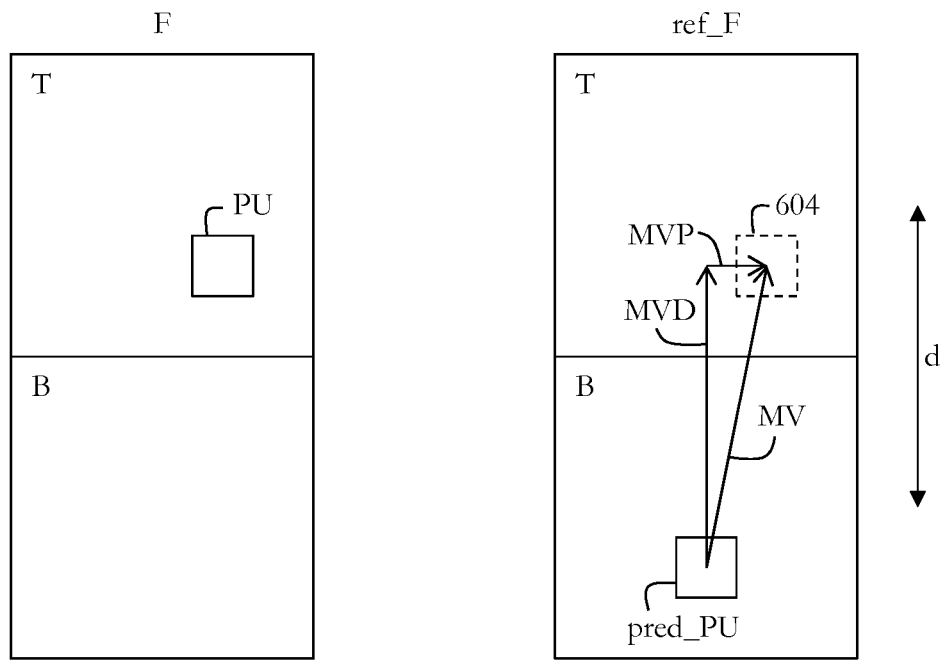
FIG. 6 illustrates a motion vector difference determination step of the video encoding method of FIG. 3.

With reference to FIG. 6, an example of carrying out steps 316 to 322 will now be described. As explained before, each frame F is formed by a TOP field T forming a top half of the frame F and a BOT field B forming a bottom half of the frame F. A target part PU is located inside the field T. A prediction part pred_PU is determined in the BOT field B of a reference frame ref_F. The reference 604 illustrates the position of the target part PU when frame F is superimposed with frame ref_F. The motion vector MV is determined as the vector between the prediction part pred_PU and the target part PU. A motion vector predictor MVP is determined, and the motion vector difference MVD corresponds to the difference between the motion vector predictor MVP and the motion vector MV. Furthermore, the distance between the centers of the two fields T, B is referred to as d. In the described example, the distance d also represents the height of each field T, B.

Back to FIG. 3, the following steps 324 to 334 are carried out for each component MVD [c] of the motion vector difference MVD.

At a step 324, the prediction unit 108 determines the sign of the component MVD[c]. In the described example, the result of the sign determination is stored in two flags of the HEVC standard: mvd_sign_flag[0] for the horizontal component MVD[0] and mvd_sign_flag[1] for the vertical component MVD [1].

At a step 326, the prediction unit 108 determines whether the absolute value of the component MVD[c] is greater than zero and the result of the determination is stored in a greater-than-zero value. In the described example, the greater-than-zero value comprises a flag used in the HEVC standard: abs_mvd_greater0_flag[0] for the horizontal component and abs_mvd_greater0_flag[1] for the vertical component.

At a step 328, if the absolute value of the component MVD[c] is greater than zero, the prediction unit 108 determines whether the absolute value of the component MVD [c] is greater than one and the result of the determination is stored in a greater-than-one value. In the described example, the greater-than-one value comprises a flag used in the HEVC standard: abs_mvd_greater1_flag[0] for the horizontal component and abs_mvd_greater1_flag[1] for the vertical component.

At a step 330, if the absolute value of the component MVD [c] is greater than one, the prediction unit 108 determines whether the field of the prediction part pred_PU is different from the field of the target part PU, which is the case illustrated on FIG. 6 (which would correspond on FIG. 6 to the prediction field being a field B, while the target part PU belonging to a field T). Specifically, the prediction unit 108 determines whether the field of the prediction part pred_PU and the field of the target part PU are of same parity/type.

At a step 332, if the pixels from which the prediction part pred_PU is determined belong to a field, called prediction field, different from the field of the target part PU, the prediction unit 108 subtracts a pixel offset from the absolute value of the component MVD[c]. The pixel offset is equal to two pixels plus, for at least one component, an additional pixel offset. In the described example, the additional pixel offset is an integer number of pixel(s) greater than zero. As an alternative, the additional pixel offset is equal to one or several predetermined fractions of a pixel. For example, in the AVC standard, the additional pixel offset could be one or several quarters of a pixel. For the horizontal component, the horizontal additional pixel offset is equal to the horizontal distance, if any, between the center of the prediction field and the center of the field of the target part PU. For the vertical component, the vertical additional pixel offset is equal to the vertical distance, if any, between the center of the prediction field and the center of the field of the target part PU. In the described example, the result of the subtraction is stored in two variables used in the HEVC standard: abs_mvd_minus2[0] for the horizontal component and abs_mvd_minus2[1] for the vertical component. It should be noted that these two variables are used in the HEVC standard to store the subtraction of two from the absolute value of the component MVD[c], without any additional pixel offset.

If the prediction field is the same than the field of the target part PU (which would correspond on FIG. 6 to the prediction field being a field T, while the target part PU belonging to a field T, i.e. the prediction field and the field of the target part PU are of same parity), the prediction unit 108 subtracts only two pixels from the absolute value of the component MVD[c]. In the described example, the result of the subtraction, called subtraction value, is stored in the two variables used in the HEVC standard: abs_mvd_minus2[0] for the horizontal component, and abs_mvd_minus2[1] for the vertical component.

At a step 334, the prediction unit 108 produces an additional pixel offset presence indicator indicating whether an additional pixel offset has been subtracted. In the described example, the additional pixel offset presence indicator comprises one flag for each component MVD[c]: mvd_offset_flag[0] for the horizontal component and mvd_offset_flag[1] for the vertical component.

In the described example, as illustrated on FIG. 6, there is no horizontal additional pixel offset, so that mvd_offset_flag[0] is equal to zero. However, there is a vertical additional pixel offset, so that mvd_offset_flag[0] is equal to one. As explained above, the vertical additional pixel offset is equal to the distance d. In the described example, the distance d is also equal to the height of each field, and to half the height of the frame. From what precedes, abs_mvd_minus2[0] stores the absolute value of the horizontal component MVD[0] minus two, and abs_mvd_minus2[1] stores the absolute value of the vertical component MVD[1] minus two and minus the vertical additional pixel offset.

The use of an additional pixel offset can increase the efficiency of the encoding. In fact, in some videos, the prediction part is often located inside the same field than the target part, so that the motion vector is small. It follows that the motion vector predictor is also often small. Therefore, when the prediction part is in another field, the motion vector is long, while the motion vector predictor may be small. This situation leads to a long motion vector difference. This is the situation illustrated on FIG. 6. The use of the pixel offset reduces the length of the motion vector difference, and therefore less data needs to be encoded. Furthermore, when the prediction part is in another field than the target part, the prediction part and the target part are still often in the same region of their respective field. That is why taking the additional pixel offset as the distance between the centers of the two fields gives good results.

At a step 336, the prediction unit 210 produces prediction data PD including in particular, for each target part PU and for each component MVD[c] of the motion vector difference MVD for the target part PU: its sign (step 324), the greater-than-zero value (step 326), the greater-than-one value (step 328), the additional pixel offset presence indicator (step 334) and the subtraction value (steps 330 and 332).

The following steps 338 to 350 are carried out for both intra and inter encoded frames.

At a step 338, the comparison unit 110 compares the part PU with the prediction part pred_PU in order to produce a residual part res_PU.

At a step 340, the transform unit 214 determines coefficients of a transform of the residual part res_PU, for example a DCT (English acronym for "Discrete Cosine Transform"). The transform unit 214 further processes the coefficients in order to produce transform data TD. The processing usually comprises quantization.

At a step 342, the inverse transform unit 114 determines an approximated residual part res_PU* from the transform data TD.

At a step 344, the reconstruction unit 116 determines a reconstructed part rec_PU from the prediction part pred_PU and the approximated residual part res_PU*.

When all reconstructed parts rec_PUs of a frame F have been determined, a reconstructed frame rec_F is produced.

At an optional step 346, the filter unit 118 filters the reconstructed frame rec_F and stores the resulting frame in a buffer (e.g. a part of memory 204) where the frame becomes a reference frame ref_F.

At an optional step 348, the filter unit 118 further produces filter data FD representing the applied filter(s). In the described example, the applied filter(s) comprise(s) a deblocking filter followed by a sample adaptive offset filter, as specified in the HEVC standard.

At a step 350, the entropy coding unit 120 produces an encoded video of the sequence of frames, in the form of a bitstream BS. The encoded video comprising the general data GD, the prediction data PD, the transform data TD and optionally the filter data FD. In the described example, the encoded video is for example obtained by entropy coding.

It should be noted that steps 306 to 350 can be applied to a progressive video, with very little modification. In particular, a GOP structure intended for progressive video coding can be used in the previous video encoding method 300. In particular, as demonstrated previously, the HEVC standard which defines progressive video encoding, can be used with little modification.

Figure 7:
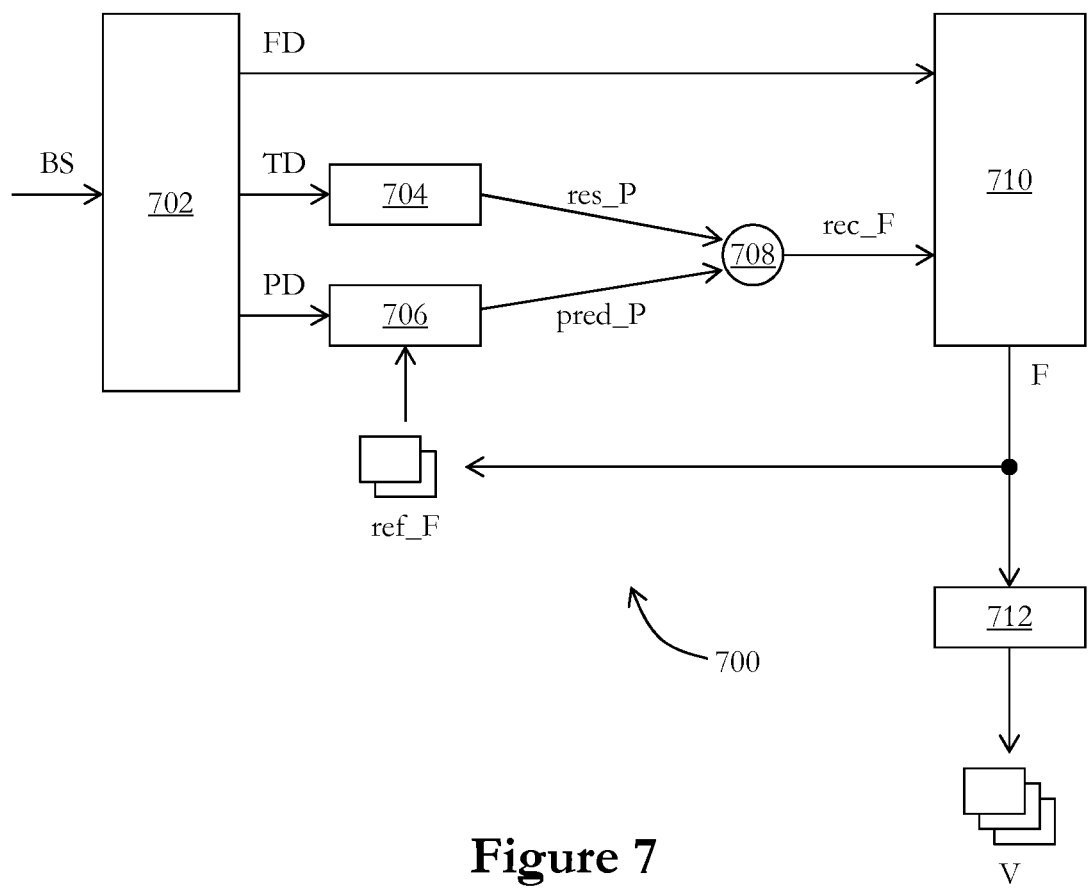
FIG. 7 illustrates a video decoding device according to the invention.

With reference to FIG. 7, a video decoding device 700 for decoding an encoded video of a sequence of frames, in the form of a bitstream BS, will now be described.

The video decoding device 700 comprises a general control unit 702 configured to receive the encoded video and to determine data from the encoded video.

The video decoding device 700 further comprises a transform unit 704 configured, for each part PU to be decoded, to determine a residual part res_PU from the transform data TD.

The video decoding device 700 further comprises a decoding unit 706 configured, for each part PU to be decoded, to determine a prediction part pred_PU from the prediction data PD, according to an intra-prediction method or an inter-prediction method.

The video decoding device 700 further comprises a combining unit 708 configured, for each part PU to be decoded, to combine the residual part res_PU with the predicted part pred_PU, to produce a reconstructed part. The combining unit 708 is further configured to produce a reconstructed frame rec_F from the reconstructed parts.

The video decoding device 700 optionally further comprises a filter unit 710 configured to filter the reconstructed frame rec_F according to the filter data FD, to produce a decoded frame F.

The units 704 to 710 form a frame decoder.

The video decoding device 700 further comprises a frame dividing unit 712 configured to produce at least two consecutive fields from each frame F, so as to produce an interlaced video V comprising the sequence of fields.

Figure 8:
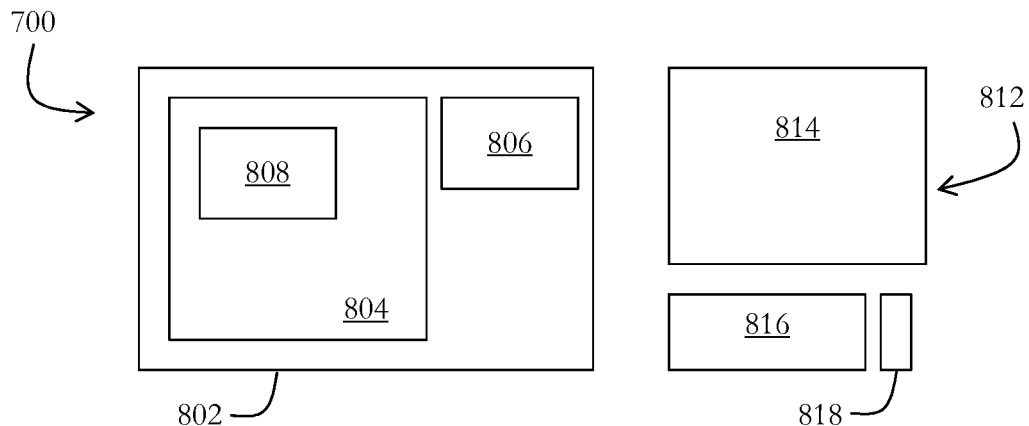
FIG. 8 illustrates a specific implementation of the decoding device of FIG. 7.

With reference to FIG. 8, a specific implementation of the video decoding device 700 will now be described.

The video decoding device 700 is a computer system comprising a computer case 802 enclosing a memory 804 and a processing unit 806. The computer system could the same than the one depicted on FIG. 2.

The video decoding device 700 further comprises a video decoding program 808 stored in the memory 804. The video decoding program 808 comprises instructions intended to be executed by the processing unit 806 so as to carry out a video decoding method which will be described in greater detail with reference to FIG. 9.

The video decoding device 700 further comprises a human computer interface 812 including for example a display 814 and input devices such as a keyboard 816 and a pointing device 818.

Figure 9:
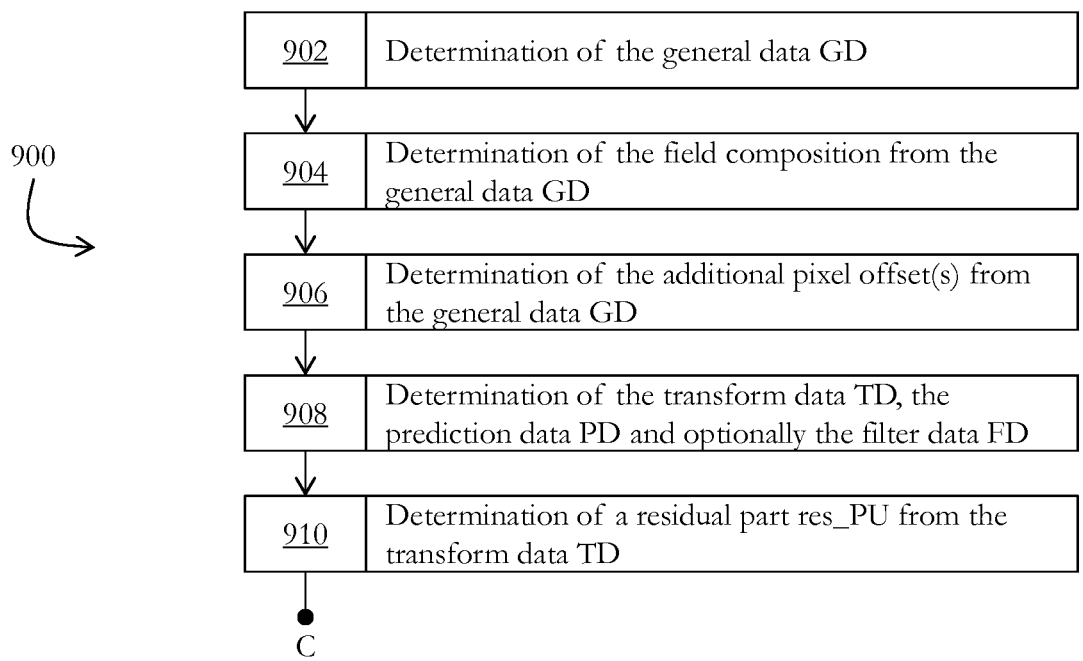
FIG. 9 illustrates a video decoding method intended to be carried out by the video decoding device of FIG. 7.
Figure 9:
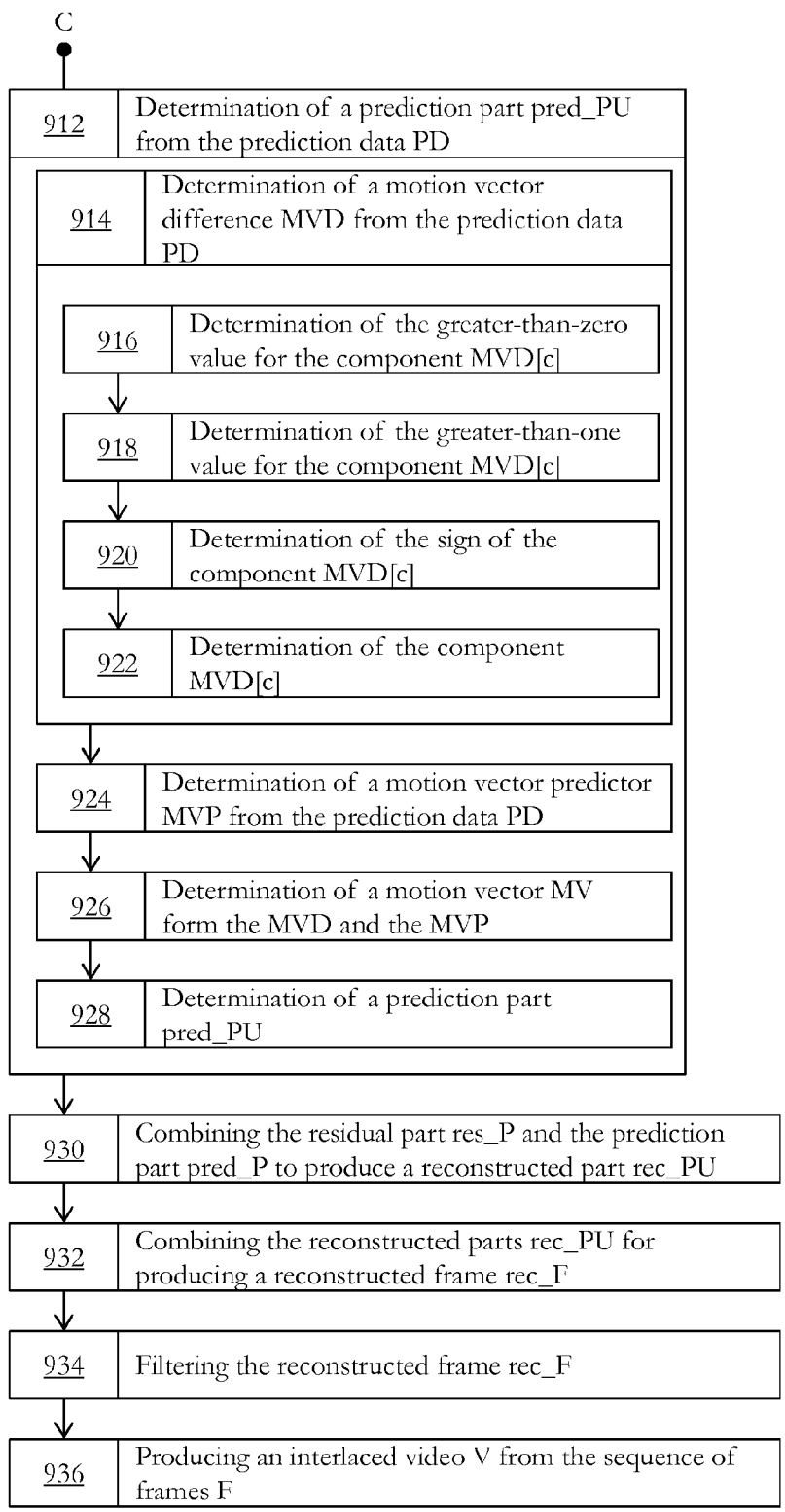

With reference to FIG. 9, a video decoding method 900 for decoding an encoded video of a sequence of frames, in the form of a bitstream BS, for example the bitstream produced by the video coding device 100 of FIG. 1, carried out by the video encoding device 700 of FIG. 7 or 8, will now be described.

At a step 902, the general control unit 702 determines the general data GD from the encoded video.

At a step 904, the general control unit 702 further determines the field composition of the frames from the general data GD. In the described example the field composition comprises the pic_struct variable.

At a step 906, the general control unit 702 determines the additional pixel offset(s) from the general data GD. In the described example, the general control unit 702 determines the variable mvd_offset[1] storing the vertical additional pixel offset. In the absence of the other variable mvd_offset[0], the general control unit 702 considers that the horizontal additional pixel offset is equal to zero.

The following steps 908 to 930 are carried out for each part PU, called current part PU, encoded in the encoded video.

At a step 908, the general control unit 702 determines from the encoded video the transform data TD, the prediction data PD, and optionally the filter data FD corresponding to the current part PU.

At a step 910, the transform unit 704 determines a residual part res_PU from the transform data TD.

At a step 912, the decoding unit 706 determines a prediction part pred_PU from the encoded video, and more precisely from the prediction data PD, according to an intra-prediction method or an inter-prediction method.

In the case of inter-prediction, the following steps 914 to 928 are carried out during step 912.

At a step 914, the decoding unit 706 determines a motion vector difference MVD from the prediction data. The determination of the motion vector difference MVD comprises, for each component MVD[c] of the motion vector difference MVD, the following steps 916 to 922 (the variables and flags used in the described example are indicated between parentheses).

At a step 916, the decoding unit 706 determines the greater-than-zero value (i.e. the syntax element value abs_mvd_greater0_flag[c]) from the prediction data PD. If the value is false, the decoding unit 706 considers that the component MVD[c] is equal to zero.

At a step 918, if the absolute value of the component MVD[c] is greater than zero, the decoding unit 706 determines the greater-than-one value (i.e. the syntax element value abs_mvd_greater1_flag[c]) from the prediction data PD. If the value is false, the component MVD [c] is equal to one.

At a step 920, if the absolute value of the component MVD[c] is greater than zero, the decoding unit 706 determines the sign of the component MVD[c] (mvd_sign_flag [c]), the subtraction value (abs_mvd_minus2[c]) and the additional pixel offset indicator (mvd_offset_flag[c]) from the prediction data PD.

At a step 922, the decoding unit 706 determines the component MVD [c] from the data determined from the encoded video. In particular, the decoding unit 706 adds to the subtraction value (abs_mvd_minus2[c]) a pixel offset of two plus, if the additional pixel offset indicator (mvd_offset_flag[c]) indicates the presence of an additional pixel offset, the additional pixel offset determined from the encoded video at step 906, in order to determine the absolute value of the component MVD[c]. The sign determined at step 920 is then applied to this absolute value to determine the component MVD[c].

In the described example where the HEVC standard is used, the following syntax is used to represent the previous steps 916 to 922.

|  | Descriptor |
|---|---|
| mvd_coding( x0, y0, refList ) { |  |
|   abs_mvd_greater0_flag[ 0 ] | ae(v) |
|   abs_mvd_greater0_flag[ 1 ] | ae(v) |
|   if(abs_mvd_greater0_flag[ 0 ] ) |  |
|     abs_mvd_greater1_flag[ 0 ] | ae(v) |
|   if(abs_mvd_greater0_flag[ 1 ] ) |  |
|     abs_mvd_greater1_flag[ 1 ] | ae(v) |
|   if(abs_mvd_greater0_flag[ 0 ] ) { |  |
|     if(abs_mvd_greater1_flag[ 0 ] ) |  |
|       abs_mvd_minus2[ 0 ] | ae(v) |
|     mvd_sign_flag[ 0 ] | ae(v) |
|   } |  |
|   if(abs_mvd_greater0_flag[ 1 ] ) { |  |
|     if(abs_mvd_greater1_flag[ 1 ] ) { |  |
|       mvd_offset_flag[ 1 ] | ae(v) |
|       abs_mvd_minus2[ 1 ] | ae(v) |
|     } |  |
|     mvd_sign_flag[ 1 ] | ae(v) |
|   } |  |
| } |  |

In the described example, the component MVD[c] is calculated as follows:

$$MVD[c] = abs\_mvd\_greater0\_flag[c] * (mvd\_offset\_flag[c] * mvd\_offset[c] + abs\_mvd\_minus2[c] + 2) * (1 - 2 * mvd\_sign\_flag[c])$$

At a step 924, the decoding unit 706 determines a motion vector predictor MVP from the prediction data PD.

At a step 926, the decoding unit 706 determines a motion vector MV from the motion vector difference MVD and the motion vector predictor MVP.

At a step 928, the decoding unit 706 determines a prediction part pred_PU from pixels of a reference frame ref_F, i.e. a frame already decoded, these pixels being determined from the motion vector MV.

At a step 930, the combining unit 708 combines the residual part res_PU and the prediction part pred_PU to produce a reconstructed part.

At a step 932, when all the parts of a frame are reconstructed, i.e. when all the reconstructed parts of the frame have been produced, the combining unit 708 combines the reconstructed parts and produces this frame, called reconstructed frame rec_F.

At an optional step 934, the filter unit 710 filters the reconstructed frame rec_F according to the filter data FD to produce a decoded frame F. At least some decoded frames are stored in a buffer to serve as reference frames ref_F.

At a step 936, the frame dividing unit 712 produces an interlaced video V from the sequence of frames F, by extracting at least two rectangular regions of each frame F, and defining the extracted rectangular regions as consecutive fields of the interlaced video V. In the described example where each frame comprises a first field located on top of a second field, the dividing unit 712 horizontally divides the frame F between a top half and a bottom half, extracts the top half of the frame F and defines it as a first field (a TOP field) and extracts the bottom half of the frame and defines it as the following field (a BOT field). This is the inverse operation of the case A illustrated on FIG. 5.

The produced interlaced video can then be displayed on a display device, such as the one of FIG. 8.

The present invention is not limited to the embodiment previously described, but instead defined by the appended claims. It will in fact be apparent to the one skilled in the art that modifications can be applied to the embodiments previously described.

For example, the units of the devices could be formed all or in part by hardware circuitry intended to carry out the same functions. It will be appreciated by those skilled in the art that the block diagrams presented herein represent conceptual views of illustrative system components and/or circuitry embodying the principles of the invention. Similarly, it will be appreciated that any flow charts, flow diagrams, state transition diagrams, pseudocode, and the like represent various processes which may be substantially represented in computer readable storage media and so executed by a computer or processor, whether or not such computer or processor is explicitly shown.

Furthermore, the motion vector representation could be the motion vector itself.

Besides, the terms used in the appended claims shall not be understood as limited to the elements of the embodiments previously described, but on the contrary shall be understood as including all equivalent elements that the one skilled in the art is able to derive using their general knowledge.

The invention claimed is:

1. A method for encoding an interlaced video comprising a sequence of alternating TOP and BOT fields, the method comprising:
    producing a sequence of frames, each frame being determined from at least two consecutive fields, each field forming a region of the frame,
    encoding each frame of the sequence to produce an encoded video of the sequence of frames;
    wherein encoding each frame of the sequence comprises, for an inter-predicted part of a frame:
    determining a prediction part from pixels of a reference frame,
    determining a representation of a motion vector corresponding to a distance in pixels between a position of the inter-predicted part in the frame and the position of the prediction part in the reference frame,
    subtracting a pixel offset greater than two pixels from an absolute value of at least one component of the motion vector representation in the case where the pixels from which the prediction part is determined belong to a field, called prediction field, whose parity is different from the parity of the field of the inter-predicted part,
    producing prediction data comprising the subtraction value and a pixel offset presence indicator.

2. The video encoding method according to claim 1, wherein the regions of the frame are rectangular regions.

3. The video encoding method according to claim 1, wherein the motion vector representation is a motion vector difference between a motion vector predictor and the motion vector.

4. The video encoding method according to claim 1, wherein the pixel offset for the vertical component is equal to two plus an additional pixel offset, the additional pixel offset being equal to a vertical distance between a center of the prediction field and a center of the field of the inter-predicted part.

5. The video encoding method according to claim 1, wherein each frame being produced from two consecutive fields by putting together the two fields one on top of the other and aligned vertically, the pixel offset, for the vertical component, is equal to two plus an additional pixel offset, the additional pixel offset being equal to the height of one of the two fields.

6. A video encoding device for encoding an interlaced video comprising a sequence of alternating TOP and BOT fields, the device comprising: a field combining unit configured to produce a sequence of frames, each frame being determined from at least two consecutive fields, each forming a region of the frame, a frame encoder configured to encode each frame of the sequence to produce an encoded video of the sequence of frames wherein to encode each frame of the sequence comprises, for an inter-predicted part of a frame: to determine a prediction part from pixels of a reference frame, to determine a representation of a motion vector corresponding to a distance in pixels between a position of the inter-predicted part in the frame and the position of the prediction part in the reference frame, to subtract a pixel offset greater than two pixels from an absolute value of at least one component of the motion vector representation in the case where the pixels from which the prediction part is determined belong to a field called prediction field, whose parity is different from the parity of the field of the inter-predicted part, to produce prediction data comprising the subtraction value and a pixel offset presence indicator.

7. A method for decoding an encoded video of a sequence of frames, the method comprising:
    decoding each frame of the sequence,
    producing an interlaced video from the sequence of frames by extracting at least two regions of each frame, and defining the extracted regions as consecutive fields of the interlaced video;
    wherein decoding each frame of the sequence comprises, for an inter-predicted part of a frame:
    determining a motion vector representation from the encoded video, which comprises determining an absolute value of at least one component of the motion vector representation by adding a pixel offset greater than two pixels to a value determined from the encoded video in the case where the pixels from which the prediction part is determined belong to a field, called prediction field, whose parity is different from the parity of the field of the inter-predicted part,
    determining a motion vector from the motion vector representation,
    determining a prediction part from pixels of a reference frame, the pixels being determined from the motion vector.

8. The video decoding method according to claim 7, wherein the regions of the frame are rectangular regions.

9. The video decoding method according to claim 7, wherein producing the interlaced video comprises horizontally dividing the frame into a top part defined as a first field and a bottom part defined as a second field.

10. The video decoding method according to claim 7, wherein each frame being produced from two consecutive fields by putting together the two fields one on top of the other and aligned vertically, wherein, the pixel offset, for a vertical component, is equal to two plus an additional pixel offset, the additional pixel offset being equal to an height of one of the two fields.

11. A video decoding device comprising: a frame decoder configured to decode each frame of a sequence of frames, a frame dividing unit configured to produce an interlaced video from the sequence of frames by extracting at least two regions of each frame, and defining the extracted regions as consecutive fields of the interlaced video, wherein to decode each frame of the sequence comprises, for an inter-predicted part of a frame: to determine a motion vector representation from the encoded video, which comprises determining an absolute value of at least one component of the motion vector representation by adding a pixel offset greater than two pixels to a value determined from the encoded video in the case where the pixels from which the prediction part is determined belong to a field; called prediction field, whose parity is different from the parity of the field of the inter-predicted part, to determine a motion vector from the motion vector representation, to determine a prediction part from pixels of a reference frame, the pixels being determined from the motion vector.

12. The video encoding device according to claim 6, wherein the regions of the frame are rectangular regions.

13. The video encoding device according to claim 6, wherein the motion vector representation is a motion vector difference between a motion vector predictor and the motion vector.

14. The video encoding device according to claim 6, wherein the pixel offset for the vertical component is equal to two plus an additional pixel offset, the additional pixel offset being equal to a vertical distance between a center of the prediction field and a center of the field of the inter-predicted part.

15. The video encoding device according to claim 14, wherein each frame being produced from two consecutive fields by putting together the two fields one on top of the other and aligned vertically, the pixel offset for, the vertical component, is equal to two plus an additional pixel offset, the additional pixel offset being equal to the height of one of the two fields.

16. The video decoding device according to claim 11, wherein the regions of the frame are rectangular regions.

17. The video decoding device according to claim 11, wherein to produce the interlaced video comprises to horizontally divide the frame into a top part defined as a first field and a bottom part defined as a second field.

18. The video decoding device according to claim 11, wherein, each frame being produced from two consecutive fields by putting together the two fields one on top of the other and aligned vertically the pixel offset, for a vertical component, is equal to two plus an additional pixel offset, the additional pixel offset being equal to an height of one of the two fields.

19. The video encoding method according to claim 1, wherein the pixel offset for the horizontal component is equal to two plus an additional pixel offset, the additional pixel offset being equal to a horizontal distance between a center of the prediction field and a center of the field of the inter-predicted part.

20. The video encoding device according to claim 6, wherein the pixel offset for the horizontal component is equal to two plus an additional pixel offset, the additional pixel offset being equal to a horizontal distance between a center of the prediction field and a center of the field of the inter-predicted part.

21. The video decoding method according to claim 7, wherein the pixel offset for the vertical component is equal to two plus an additional pixel offset, the additional pixel offset being equal to a vertical distance between a center of the prediction field and a center of the field of the inter-predicted part.

22. The video decoding method according to claim 7, wherein the pixel offset for the horizontal component is equal to two plus an additional pixel offset, the additional pixel offset being equal to a horizontal distance between a center of the prediction field and a center of the field of the inter-predicted part.

23. The video decoding device according to claim 11, wherein the pixel offset for the vertical component is equal to two plus an additional pixel offset, the additional pixel offset being equal to a vertical distance between a center of the prediction field and a center of the field of the inter-predicted part.

24. The video decoding device according to claim 11, wherein the pixel offset for the horizontal component is equal to two plus an additional pixel offset, the additional pixel offset being equal to a horizontal distance between a center of the prediction field and a center of the field of the inter-predicted part.

* * * * *